(12) United States Patent
Cai et al.

(10) Patent No.: US 8,462,657 B2
(45) Date of Patent: Jun. 11, 2013

(54) CHANNEL QUALITY INDICATOR TRANSMISSION TIMING WITH DISCONTINUOUS RECEPTION

(75) Inventors: Zhijun Cai, Euless, TX (US); James Earl Womack, Bedford, TX (US); Yi Yu, Irving, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 13/247,770

(22) Filed: Sep. 28, 2011

(65) Prior Publication Data

US 2012/0076060 A1    Mar. 29, 2012

Related U.S. Application Data

(63) Continuation of application No. 12/052,887, filed on Mar. 21, 2008, now Pat. No. 8,121,045.

(51) Int. Cl.
*H04W 24/02* (2009.01)
*H04W 24/10* (2009.01)
*H04W 72/04* (2009.01)

(52) U.S. Cl.
USPC ............ 370/252; 370/282; 455/424; 455/450

(58) Field of Classification Search
USPC ................... 370/252, 282, 311; 455/24, 423, 455/424, 425, 450, 452.1
See application file for complete search history.

(56) References Cited

U.S. PATENT DOCUMENTS

| 7,496,048 | B2 * | 2/2009 | Ikeda et al. ................... 370/252 |
| 7,724,697 | B2 | 5/2010 | Dalsgaard et al. |
| 7,844,265 | B2 | 11/2010 | Kuchibhotla et al. |
| 7,957,360 | B2 | 6/2011 | Suzuki et al. |
| 8,112,075 | B2 * | 2/2012 | Pedersen ....................... 455/425 |
| 8,199,725 | B2 * | 6/2012 | Yu et al. ........................ 370/334 |
| 8,249,004 | B2 * | 8/2012 | Wang et al. ................... 370/329 |
| 2004/0063430 | A1 | 4/2004 | Cave et al. |
| 2007/0133479 | A1 | 6/2007 | Montojo et al. |
| 2007/0149993 | A1 | 6/2007 | Kasahara et al. |
| 2007/0177569 | A1 | 8/2007 | Lundby |
| 2007/0254598 | A1 | 11/2007 | Bachl et al. |
| 2007/0254656 | A1 | 11/2007 | Dalsgaard et al. |
| 2007/0260956 | A1 | 11/2007 | Terry et al. |
| 2007/0287468 | A1 | 12/2007 | Jeong et al. |
| 2007/0291728 | A1 | 12/2007 | Dalsgaard et al. |

(Continued)

FOREIGN PATENT DOCUMENTS

| EP | 1601224 | 11/2005 |
| EP | 1916859 | 4/2008 |

(Continued)

OTHER PUBLICATIONS

Examiner's First Report issued in Australian Application No. 2009225546 on Aug. 15, 2012; 3 pages.

(Continued)

*Primary Examiner* — Chi Pham
*Assistant Examiner* — Ahmed Elallam
(74) *Attorney, Agent, or Firm* — Fish & Richardson P.C.

(57) ABSTRACT

A user equipment (UE) is disclosed. The UE includes a processor configured to begin channel quality indicator (CQI) transmissions using an assigned periodic CQI reporting resource before the start of the on-duration of a discontinuous reception (DRX) operation mode.

13 Claims, 9 Drawing Sheets

U.S. PATENT DOCUMENTS

| | | |
|---|---|---|
| 2007/0293233 A1 | 12/2007 | Inoue et al. |
| 2008/0008510 A1 | 1/2008 | Lee et al. |
| 2008/0026744 A1 | 1/2008 | Frederiksen et al. |
| 2008/0075036 A1 | 3/2008 | Bertrand et al. |
| 2008/0101268 A1 | 5/2008 | Sammour et al. |
| 2008/0101280 A1 | 5/2008 | Gholmieh et al. |
| 2008/0117873 A1 | 5/2008 | Ranta-Aho et al. |
| 2008/0165698 A1 | 7/2008 | Dalsgaard et al. |
| 2008/0186892 A1 | 8/2008 | Damnjanovic |
| 2008/0268785 A1 | 10/2008 | McCoy et al. |
| 2008/0268863 A1 | 10/2008 | Pedersen et al. |
| 2008/0310396 A1 | 12/2008 | Park et al. |
| 2008/0311919 A1 | 12/2008 | Whinnett et al. |
| 2008/0316950 A1 | 12/2008 | Damnjanovic |
| 2009/0011718 A1 | 1/2009 | Chun et al. |
| 2009/0034468 A1 | 2/2009 | Muharemovic et al. |
| 2009/0046570 A1 | 2/2009 | Sarkar et al. |
| 2009/0046674 A1 | 2/2009 | Gao et al. |
| 2009/0052367 A1 | 2/2009 | Cai et al. |
| 2009/0082072 A1 | 3/2009 | Ulupinar et al. |
| 2009/0103500 A1 | 4/2009 | Malkamaki et al. |
| 2009/0163199 A1* | 6/2009 | Kazmi et al. ............... 455/425 |
| 2009/0168731 A1 | 7/2009 | Zhang et al. |
| 2009/0180414 A1 | 7/2009 | Maeda et al. |
| 2009/0196366 A1 | 8/2009 | Shen et al. |
| 2009/0232118 A1 | 9/2009 | Wang et al. |
| 2009/0239525 A1 | 9/2009 | Cai et al. |
| 2009/0239566 A1 | 9/2009 | Pelletier et al. |
| 2009/0239568 A1 | 9/2009 | Bertrand et al. |
| 2009/0318177 A1* | 12/2009 | Wang et al. ............... 455/515 |
| 2010/0195501 A1 | 8/2010 | Tynderfeldt et al. |
| 2010/0232382 A1 | 9/2010 | Gauvreau et al. |
| 2010/0284326 A1 | 11/2010 | Oh |
| 2011/0019637 A1 | 1/2011 | Ojala et al. |

FOREIGN PATENT DOCUMENTS

| | | |
|---|---|---|
| JP | 2007-235446 | 9/2007 |
| JP | 2009-531973 | 9/2009 |
| KR | 10-2007-0101175 | 10/2007 |
| KR | 10-2007-0104175 | 10/2007 |
| TW | 200803252 | 1/2008 |
| WO | 2006/130866 | 12/2006 |
| WO | 2007/013457 | 2/2007 |
| WO | 2007/051192 | 5/2007 |
| WO | 2007/073118 | 6/2007 |
| WO | 2007/078171 | 7/2007 |
| WO | 2007/102689 | 9/2007 |
| WO | 2007/111941 | 10/2007 |
| WO | 2007/148458 | 12/2007 |
| WO | 2007/149993 | 12/2007 |

OTHER PUBLICATIONS

"3GPP TS 36.213 V8.1.0—3rd Generation Partnership Project; Technical Specification Group Radio Access Network; Evolved Universal Terrestrial Radio Acces (E-UTRA); Physical Layer Procedures (Release 8)"; 3GPP Organizational Partners; Nov. 2007; 17 pages.

"3GPP TS 36.213 V8.2.0—3rd Generation Partnership Project; Technical Specification Group Radio Access Network; Evolved Universal Terrestrial Radio Access (E-UTRA); Physical Layer Procedures (Release 8)"; 3GPP Organizational Partners; Mar. 2008; 30 pages.

"3GPP Ts 36.300 V8.3.0—3rd Generation Partnership Project; Technical Specification Group Radio Access Network; Evolved Universal Terrestrial Radio Access (E-UTRA) and Evolved Universal Terrestrial Radio Access Network (E- Utran); Overall description; Stage 2; Release 8"; 3GPP Organizational Partners; Dec. 2007; Part 1; 99 pages.

"3GPP TS 36.300 V8.3.0—3rd Generation Partnership Project; Technical Specification Group Radio Access Network; Evolved Universal Terrestrial Radio Access (E-UTRA) and Evolved Universal Terrestrial Radio Access Network (E- UTRAN); Overall description; Stage 2; Release 8"; 3GPP Organizational Partners; Dec. 2007; Part 2; 22 pages.

"3GPP TS 36.300 V8.4.0—3rd Generation Partnership Project; Technical Specification Group Radio Access Network; Evolved Universal Terrestrial Radio Access (E-UTRA) and Evolved Universal Terrestrial Radio Access Network (E- UTRAN); Overall description; Stage 2; Release 8"; 3GPP Organizational Partners; Jan. 2008; 126 pages.

"3GPP TS 36.321 V8.1.0—3rd Generation Partnership Project; Technical Specification Group Radio Access Network; Evolved Universal Terrestrial Radio Access (E-UTRA); Medium Access Control (MAC) Protocol Specification (Release 8)"; 3GPP Organizational Partners; Mar. 2008; 30 pages.

"3GPP TS 36.321 V8.2.0—3rd Generation Partnership Project; Technical Specification Group Radio Access Network; Evolved Universal Terrestrial Radio Access (E-UTRA) Medium Access Control (MAC) Protocol Specification (Release 8)"; 3GPP Organizational Partners; May 2008; 33 pages.

Cai, Zhijun; U.S. Appl. No. 12/052,887; "Channel Quality Indicator Transmission Timing with Discontinuous Reception"; filed Mar. 21, 2008; Specification 35 pages; Drawing Sheets (Figs. 1-2, 3a-3c, 4a-4b, 5a-5b, 6-9).

Cai, Zhijun; U.S. Appl. No. 12/058,448; "Precoding Matrix Index Feedback Interaction with Discontinuous Reception" filed Mar. 28, 2008; Specification 37 pages; Drawing Sheet (Figs. 1-2, 3a-3f, 4a-4b, 5a-5b, 6-9).

Ericsson; "Clarification of DRX"; 3GPP TSG-RAN2 Meeting #62-bis; Warsaw, Poland; Jun. 30-Jul. 4, 2008; 3 pages.

Feng, Chen et al.; "A Joint Unitary Precoding and Scheduling Algorithm for MIMO-OFDM System with Limited Feedback"; IEEE 2007 International Symposium on Microwave, Antenna, Propagation, and EMC Technologies for Wireless Communications; 2007; pp. 9-12.

Love, David et al.; "Grassmannian Precoding for Spatial Multiplexing Systems"; The University of Texas at Austin; Austin, Texas; Oct. 2003; 3 pages.

Nokia; "DRX Parameters in LTE"; 3GPP TSG-RAN WG2 Meeting #57bis; St. Julian's, Malta; Mar. 26-30, 2007;7 pages.

Panasonic; "CQI Reporting during DRX Operation"; 3GPP TSG-RAN WG2 #61, R2-080871; Sorrento, Italy; Feb. 11-15, 2008; 3 pages.

Research in Motion Limited; "Some Details on CQI Transmission during DRX"; TSG-RAN WG2 #61-bis, R2-081866; Shenzhen, China; Mar. 31-Apr. 4, 2008; 10 pages.

Research in Motion Limited; "MIMO Related Uplink Feedback during DRX"; TSG-RAN WG2 #62-bis, R2-083434; Warsaw, Poland; Jun. 23-Jul. 4, 2008; 2 pages.

Research in Motion Limited; "Consideration of DRX and SPS Alignment" ; 3GPP TSG-RAN2 #65, R2-091481; Athens, Greece, Feb. 9, 2009; 4 pages.

Yu, Yi; U.S. Appl. No. 12/058,444; "Rank Indicator Transmission during Discontinuous Reception"; filed Mar. 28, 2008; Specification 38 pages; Drawing Sheets (Figs 1-2, 3a-3f, 4a-4b, 5a-5b, 6-9).

Office Action issued in U.S. Appl. No. 12/865,652 on Dec. 8, 2011; 17 pages.

Office Action issued in U.S. Appl. No. 13/244,805 on Dec. 8, 2011; 21 pages.

Office Action issued in U.S. Appl. No. 12/058,448 on Feb. 2, 2011; 13 pages.

Office Action issued in U.S. Appl. No. 12/058,448 on Apr. 26, 2011; 18 pages.

Advisory Action issued in U.S. Appl. No. 12/058,448 on Jul. 15, 2011; 3 pages.

Office Action issued in U.S. Appl. No. 12/058,444 on Jul. 8, 2011; 18 pages.

Office Action issued in U.S. Appl. No. 12/052,887 on Jan. 10, 2011; 13 pages.

Notice of Allowance issued in U.S. Appl. No. 12/052,887 on Jun. 29, 2011; 10 pages.

Notice of Allowance issued in U.S. Appl. No. 12/052,887 on Oct. 12, 2011; 8 pages.

International Search Report and Written Opinion of the International Searching Authority issued in International Application No. PCT/US2009/032591 on May 28, 2009; 9 pages.

International Preliminary Report on Patentability issued in International Application No. PCT/US2009/032591 on May 19, 2010; 8 pages.
International Search Report and Written Opinion of the International Searching Authority issued in International Application No. PCT/US2009/037854 on Aug. 3, 2009; 13 pages.
Written Opinion of the International Preliminary Examining Authority issued in International Application No. PCT/US2009/037854 on Feb. 23, 2010; 7 pages.
International Preliminary Report on Patentability issued in International Application No. PCT/US2009/037854 on Jun. 30, 2010; 16 pages.
International Search Report and Written Opinion of the International Searching Authority issued in International Application No. PCT/US2009/036013 on Oct. 1, 2009; 8 pages.
International Preliminary Report on Patentability issued in International Application No. PCT/US2009/036013 on Sep. 28, 2010; 6 pages.
International Search Report and Written Opinion of the Interantional Searching Authority issued in International Application No. PCT/US2009/037704 on Oct. 28, 2009; 10 pages.
Written Opinion of the International Preliminary Examining Authority issued in International Application No. PCT/US2009/037704 on Apr. 13, 2010; 6 pages.
International Preliminary Report on Patentability issued in International Application No. PCT/US2009/037704 on Aug. 9, 2010; 6 pages.
Communication under Rule 71(3) EPC issued in European Application No. 09726227.3 on Nov. 18, 2011; 6 pages.
Extended Search Report issued in European Application No. 09155546.6 on Aug. 27, 2009; 7 pages.
Examination Report issued in European Application No. 09155546.6 on Feb. 10, 2010; 5 pages.
Examination Report issued in European Application No. 09155546.6 on Jan. 10, 2011; 5 pages.
Communication under Rule 71(3) EPC issued in European Application No. 09155546.6 on Jul. 1, 2011; 42 pages.
Extended Search Report issued in European Application No. 08153857.1 on Aug. 21, 2008; 12 pages.
Examination Report issued in European Application No. 08153857.1 on Jan. 27, 2010; 6 pages.
Examination Report issued in European Application No. 08153857.1 on Jan. 11, 2011; 9 pages.
Office Action issued in Korean Application No. 10-2010-7024169 on Aug. 18, 2011; 9 pages.
Office Action issued in Korean Application No. 10-2010-7023425 on Aug. 23, 2011; 8 pages.
Notice of Allowance issued in Korean Application No. 10-2010-7023425 on Nov. 30, 2011; 3 pages.
Official Action issued in Mexican Application No. MX/a/2010/008477 on Jul. 15, 2011; 3 pages.
Notice of Allowance issued in Mexican Application No. MX/a/2010/010636 on Aug. 5, 2011; 1 page.
Ericsson; "Interactions between DRx and CL HARQ" (R2-074046); TSG-RAN WG2 Meeting #59bis; Shanghai, China; Oct. 8-12, 2007; 2 pages.
Nokia Siemens Networks; "Clean Up and Update on Security, Scheduling, Mobility, MBMS and DRX" (R2-075449); Change Request 36.300 CR NUM rev. 8.2.0; 3GPP TSG-RAN2 Meeting #60; Jeju, South Korea; Nov. 5-9, 2007; 106 pages.
Panasonic et al.; "Proposed Way Forward for CQ1 Feedback Control and Content in E-UTRA" (R1-072076); 3GPP TSG-RAN WG1 Meeting #49; Kobe, Japan; May 7-11, 2007; 2 pages.
Texas Instruments; "Scheduling Request and DRX" (R1-071472); 3GPP TSG RAN WG1 #48bis; St. Julians, Malta; Mar. 26-30, 2007; 5 pages.
Office Action issued in U.S. Appl. No. 12/865,652 on May 16, 2012; 19 pages.
Office Action issued in U.S. Appl. No. 13/244,805 on May 16, 2012; 22 pages.
Notice of Allowance issued in U.S. Appl. No. 12/058,444 on Jan. 18, 2012; 11 pages.

Notice of Allowance issued in U.S. Appl. No. 12/058,444 on Mar. 1, 2012; 13 pages.
Examiner's First Report issued in Australian Application No. 2009212717 on Mar. 19, 2012; 2 pages.
Examiner's First Report issued in Australian Application No. 2009228496 on Jun. 29, 2012; 3 pages.
Examiner's First Report issued in Australian Application No. 2009228889 on Jun. 1, 2012; 2 pages.
Office Action issued in Canadian Application No. 2,713,870 on Mar. 28, 2012; 2 pages.
Extended European Search Report issued in European Application No. 12166036.9 on Jun. 18, 2012; 9 pages.
Extended Search Report issued in European Application No. 11191226.7 on Apr. 27, 2012; 9 pages.
Extended Search Report issued in European Application No. 12156166.6 on Apr. 27, 2012; 9 pages.
Extended Search Report issued in European Application No. 12156271.4 on Jul. 2, 2012; 11 pages.
Communication Pursuant to Article 94(3) EPC issued in European Application No. 08153857.1 on May 7, 2012; 7 page.
Official Action issued in Japanese Application No. 2010-545193 on Apr. 26, 2012; 7 pages.
Office Action issued in Japanese Application No. 2011-501875 on Jul. 20, 2012; 7 pages.
Office Action issued in Japanese Application No. 2011-500964 on Jun. 14, 2012; 4 pages.
Office Action issued in Korean Application No. 10-2010-7019553 on Jan. 30, 2012; 8 pages.
Office Action issued in Korean Application No. 10-2012-7008432 on May 23, 2012; 10 pages.
Notice of Decision for Patent issued in Korean Application No. 10-2010-7019553 on Jun. 19, 2012; 3 pages.
Office Action issued in Korean Application No. 10-2010-07024168 on Feb. 14, 2012; 10 pages.
Office Action issued in Korean Application No. 10-2010-7024169 on Apr. 24, 2012; 6 pages.
Official Action issued in Mexican Application No. MX/a/2010/008477 on Jan. 31, 2012; 5 pages.
Office Action issued in Chinese Application No. 200980111154.5 on Oct. 9, 2012; 7 pages.
Office Action issued in Chinese Application No. 200980116711.2 on Oct. 30, 2012; 14 pages.
Official Action issued in Mexican Application No. MX/a/2010/008477 on Oct. 3, 2012; 5 pages.
Office Action issued in Canadian Application No. 2,719,814 on Nov. 22, 2012; 3 pages.
Office Action issued in U.S. Appl. No. 12/865,652 on Dec. 13, 2012; 18 pages.
Office Action issued in U.S. Appl. No. 13/244,805 on Dec. 12, 2012; 25 pages.
Notice of Allowance issued in Korean Application No. 10-2012-7008432 on Nov. 29, 2012; 3 pages.
Notice of Acceptance issued in Australian Application No. 2009228889 on Sep. 6, 2012; 3 pages.
Nokia Corporation, Nokia Siemens Networks; "Stage 3 Description of DRX"; 3GPP TSG-RAN WG2 Meeting #60bis (R2-080552); Sevilla, Spain; Jan. 14-18, 2008; 7 pages.
Nokia Corporation, Nokia Siemens Networks; "DL HARQ Operation with DRX"; 3GPP TSG-RAN WG2 Meeting #59bis (R2-073944); Shanghai, China; Oct. 8-12, 2001; 6 pages.
Office Action issued in Chinese Application No. 200980108418.1 on Sep. 28, 2012; 11 pages.
Office Action issued in Chinese Application No. 200980111178.0 on Oct. 8, 2012; 12 pages.
Extended European Search Report issued in European Application No. 12166031.0 on Aug. 28, 2012; 9 pages.
Notice of Allowance issued in Korean Application No. 10-2010-07024168 on Oct. 30, 2012; 3 pages.
Office Action issued in Canadian Application No. 2,719,111 on Feb. 25, 2013; 3 pages.
Notice of Acceptance issued in Australian Application No. 2009212717 on Mar. 25, 2013; 3 pages.

Notice of Allowance issued in Canadian Application No. 2.713.870 on Apr. 4, 2013; 1 page.
Ericsson; "Channel Feedback Format Selection" (R1-074854); 3GPP TSG-RAN WG1 Meeting #51; Korea; Nov. 5-9, 2007; 6 pages.
Office Action issued in Canadian Application No. 2,719,818 on Dec. 27, 2012; 4 pages.
Official Action issued in Japanese Application No. 2011-501938 on Dec. 20, 2012; 5 pages.
Office Action issued in Japanese Application No. 2011-501875 on Dec. 20, 2012; 14 pages.

* cited by examiner

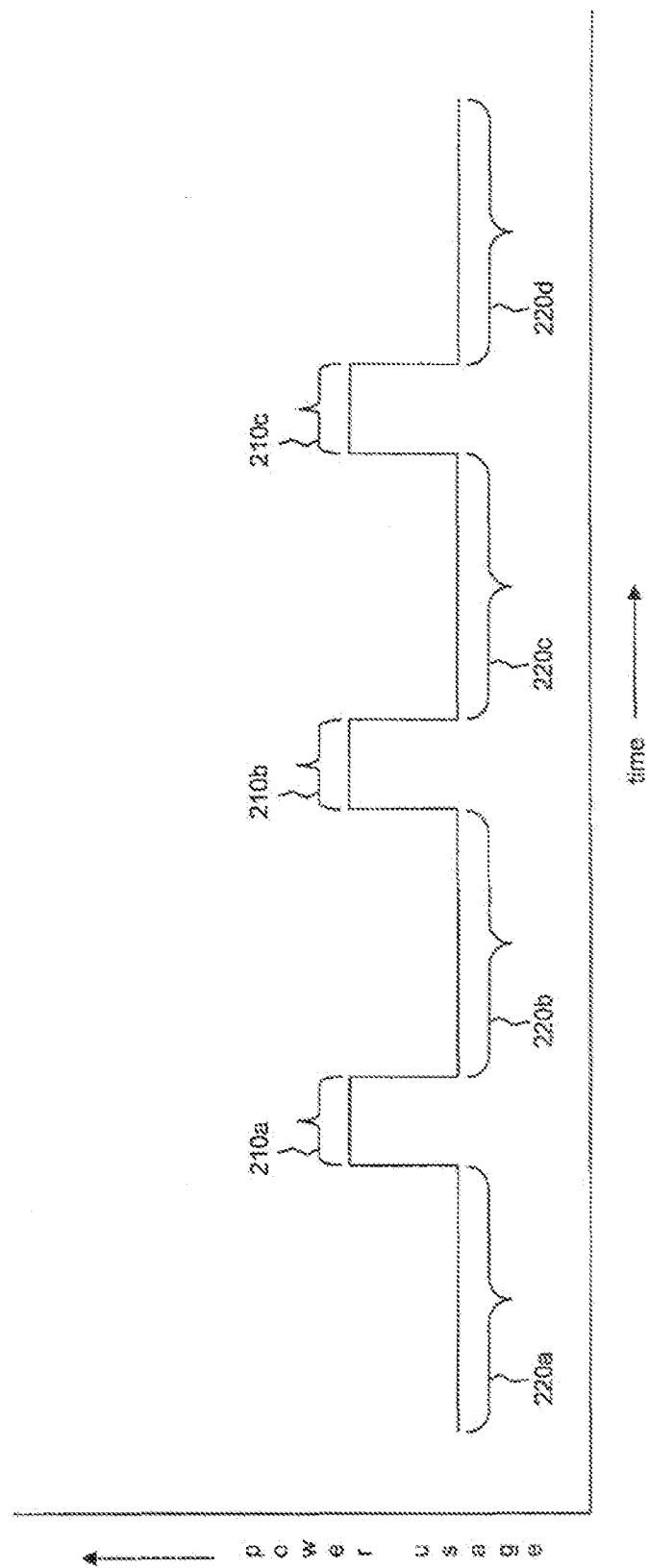

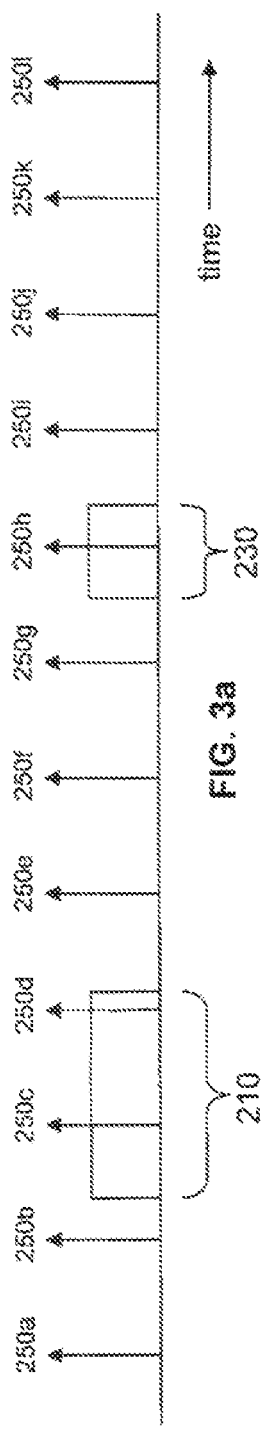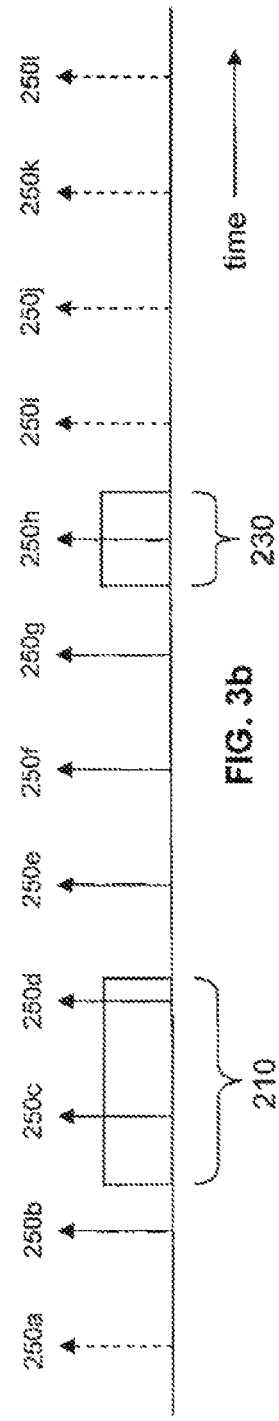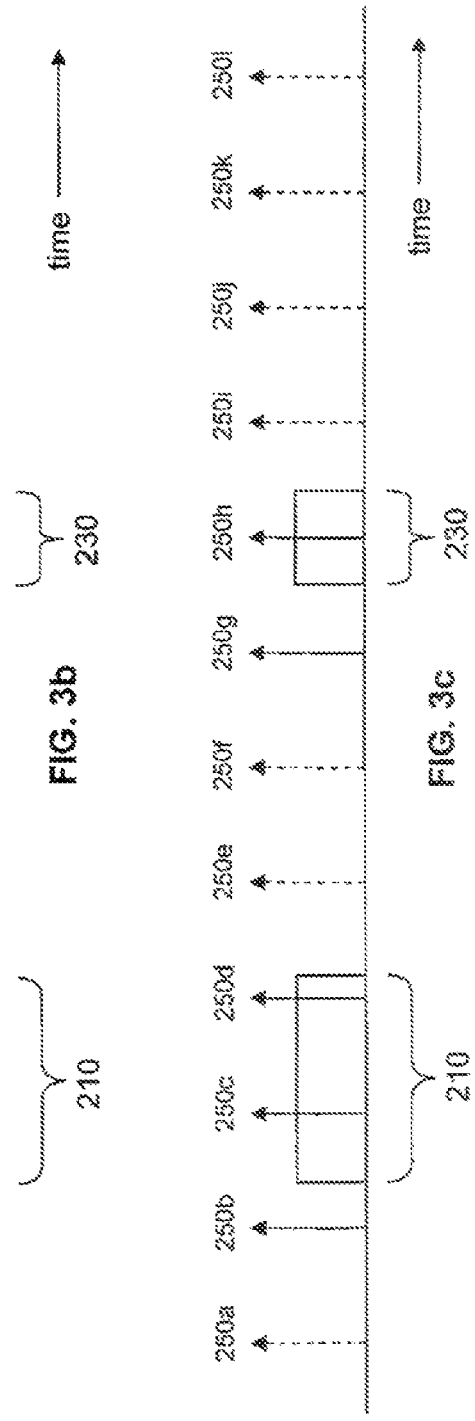

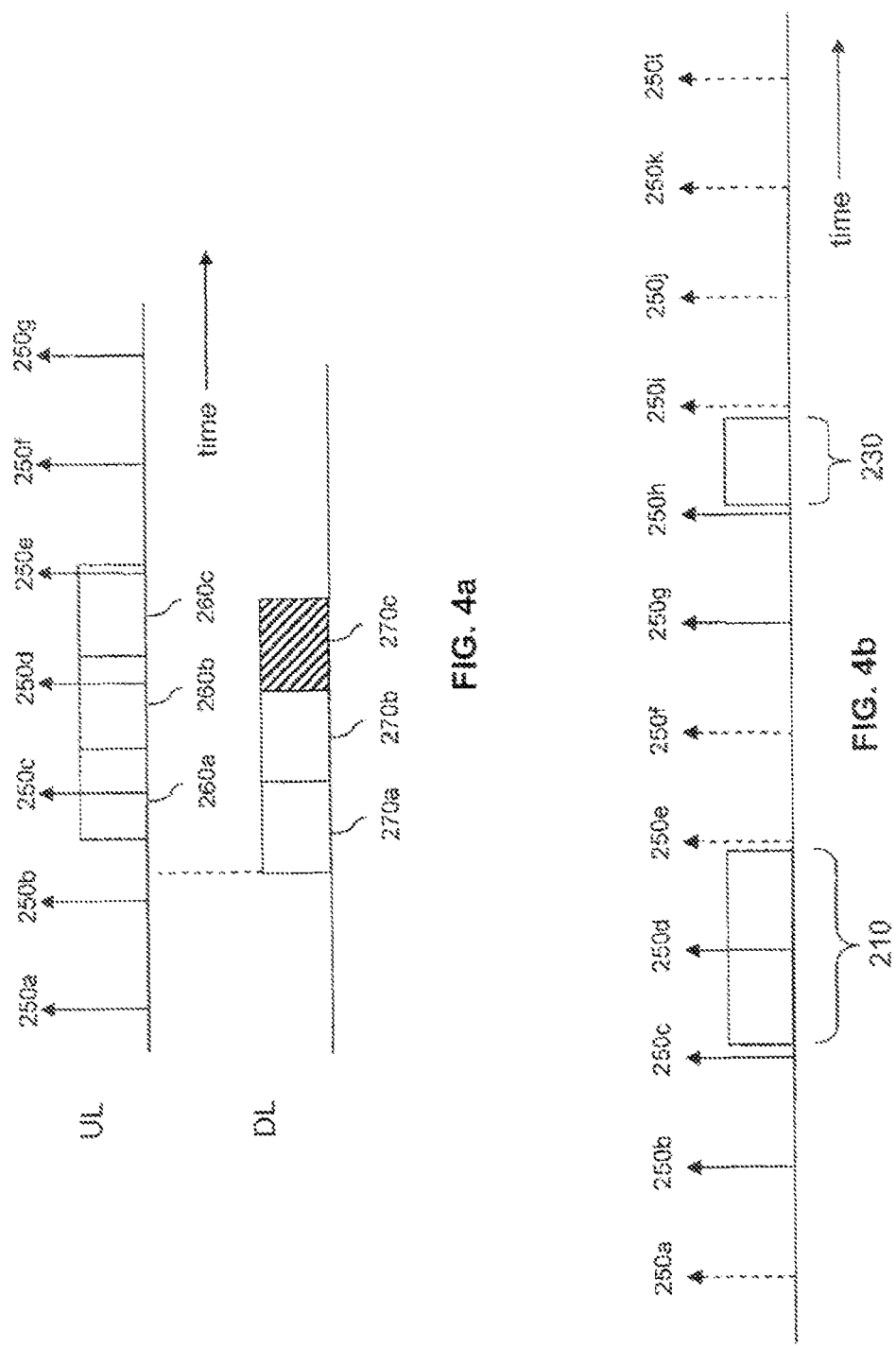

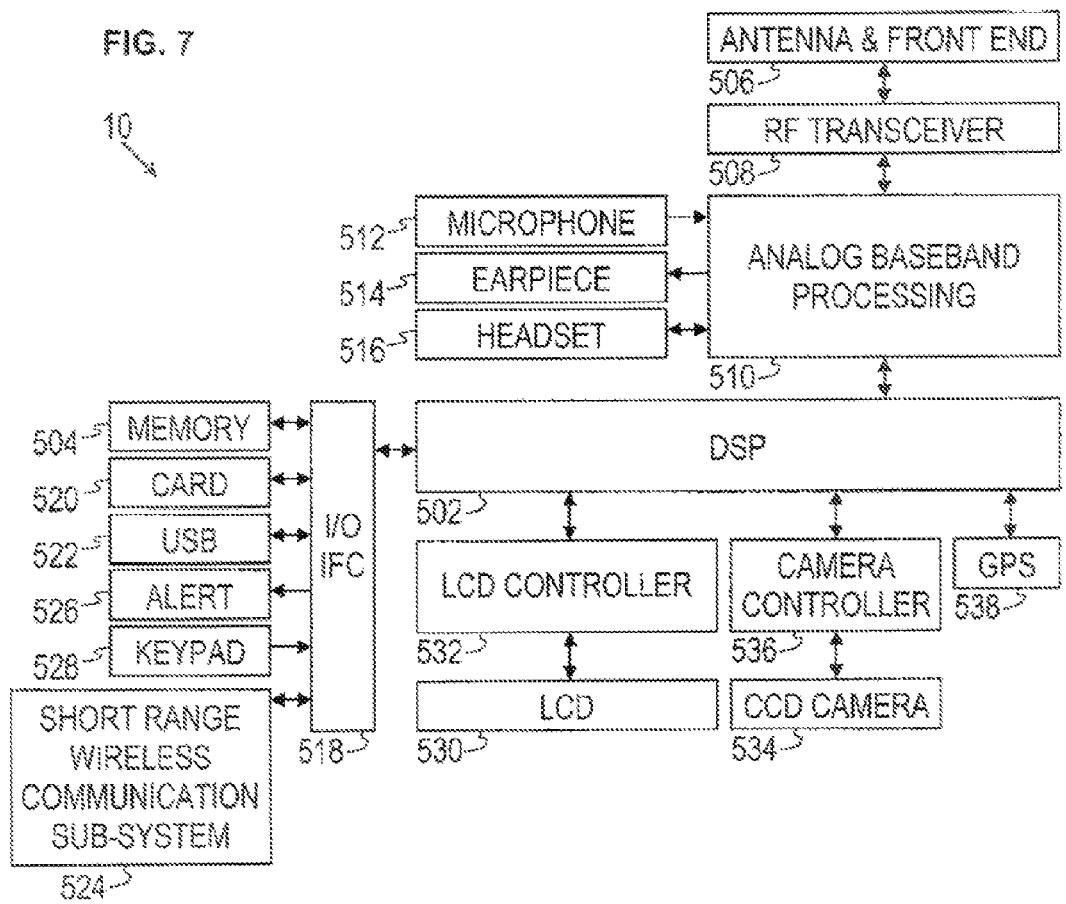
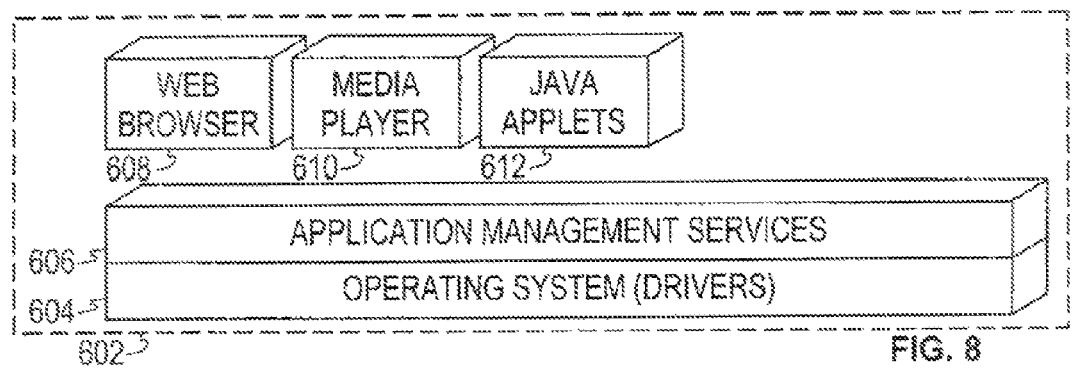

CHANNEL QUALITY INDICATOR TRANSMISSION TIMING WITH DISCONTINUOUS RECEPTION

CROSS-REFERENCE TO RELATED APPLICATIONS

This application is a continuation application of and claims priority to U.S. application Ser. No. 12/052,887 filed on Mar. 21, 2008, the entire disclosure of which is incorporated herein by reference.

BACKGROUND

Easily transportable devices with wireless telecommunications capabilities, such as mobile telephones, personal digital assistants, handheld computers, and similar devices, will be referred to herein as user equipment (UE). The term "user equipment" may refer to a device and its associated Universal Integrated Circuit Card (UICC) that includes a Subscriber Identity Module (SIM) application, a Universal Subscriber Identity Module (USIM) application, or a Removable User Identity Module (R-UIM) application or may refer to the device itself without such a card. A UE might communicate with a second UE, some other element in a telecommunications network, an automated computing device such as a server computer, or some other device. A communications connection between a UE and another component might promote a voice call, a file transfer, or some other type of data exchange, any of which can be referred to as a call or a session.

As telecommunications technology has evolved, more advanced network access equipment has been introduced that can provide services that were not possible previously. This advanced network access equipment might include, for example, an enhanced node B (ENB) rather than a base station or other systems and devices that are more highly evolved than the equivalent equipment in a traditional wireless telecommunications system. Such advanced or next generation equipment may be referred to herein as long-term evolution (LTE) equipment.

Some UEs have the capability to communicate in a packet switched mode, wherein a data stream representing a portion of a call or session is divided into packets that are given unique identifiers. The packets might then be transmitted from a source to a destination along different paths and might arrive at the destination at different times. Upon reaching the destination, the packets are reassembled into their original sequence based on the identifiers. Voice over Internet Protocol (VoIP) is a well-known system for packet switched-based voice communication over the Internet. The term "VoIP" will refer herein to any packet switched voice call connected via the Internet, regardless of the specific technology that might be used to make the call.

For a wireless VoIP call, the signal that carries data between a UE and an ENB can have a specific set of frequency, code, and time parameters and other characteristics that might be specified by the ENB. A connection between a UE and an ENB that has a specific set of such characteristics can be referred to as a resource. An ENB typically establishes a different resource for each UE with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 is a diagram illustrating on-durations and off-durations for a user equipment according to an embodiment of the disclosure.

FIG. 3a is an illustration of a periodic CQI reporting resource relative to an on-duration and a retransmission window associated with the on-duration according to an embodiment of the disclosure.

FIG. 3b is an illustration of a periodic channel quality indicator reporting resource relative to an on-duration and a retransmission window associated with the on-duration, depicting some channel quality indicator transmissions turned off according to an embodiment of the disclosure.

FIG. 3c is an illustration of a periodic channel quality indicator reporting resource relative to an on-duration and a retransmission window associated with the on-duration, depicting some channel quality indicator transmissions turned off according to an embodiment of the disclosure.

FIG. 4a is an illustration of a periodic channel quality indicator reporting resource relative to uplink sub-frames and downlink sub-frames of an enhanced node B according to an embodiment of the disclosure.

FIG. 4b is an illustration of a periodic channel quality indicator reporting resource relative to an on-duration and a retransmission window associated with the on-duration, depicting some channel quality indicator transmissions turned off according to an embodiment of the disclosure.

FIG. 7 is a block diagram of a user equipment operable for some of the various embodiments of the disclosure.

FIG. 8 is a diagram of a software environment that may be implemented on a user equipment operable for some of the various embodiments of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure In an embodiment, a user equipment (UE) is disclosed. The UE includes a processor configured to begin channel quality indicator (CQI) transmissions during an assigned periodic CQI reporting resource before the start of the on-duration of a discontinuous reception (DRX) operation mode.

In another embodiment, a method is provided for transmitting a control signal from a user equipment (UE) to an enhanced node B (ENB). The method includes determining when an on-duration of a discontinuous reception (DRX) operation of the UE is scheduled, identifying an assigned periodic channel quality indicator (CQI) reporting resource preceding the scheduled start of the on-duration, and beginning a periodic CQI control signal transmission at the time of the assigned periodic CQI reporting resource identified.

In yet another embodiment, a user equipment (UE) is provided. The UE is configured to transmit a channel quality indicator (CQI) control signal to an enhanced node B (ENB). The UE includes a component configured to periodically transmit CQI control signals during a CQI reporting interval of a retransmission window and to stop transmitting CQI control signals responsive to an end of the retransmission window.

In yet another embodiment, a method is provided for transmitting a control signal from a user equipment (UE) to an enhanced node B (ENB). The method includes identifying an assigned periodic channel quality indicator (CQI) reporting resource, and transmitting periodic CQI control signal during the retransmission window. The method includes identifying an end of a retransmission window; and responsive to an end of the retransmission window, stopping the periodic transmission of the CQI control signal.

Figure 1:
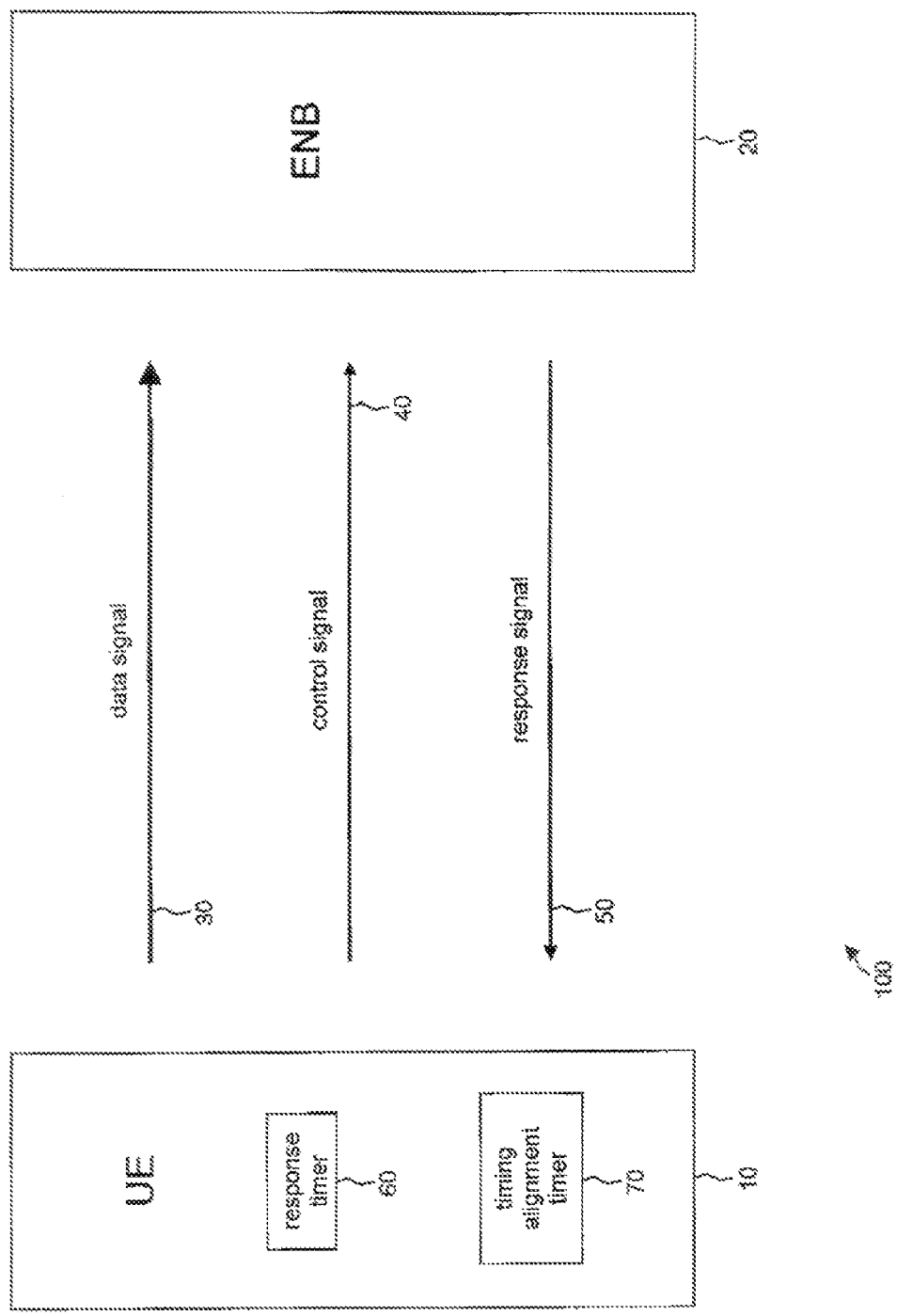
FIG. 1 is a block diagram of a telecommunications system according to an embodiment of the disclosure.

FIG. 1 illustrates an embodiment of a wireless telecommunications system 100 that includes a UE 10 capable of communicating with an ENB 20 or a similar component. Transmissions of various types of information can take place between the UE 10 and the ENB 20. For example, the UE 10 might send the ENB 20 various types of application layer data such as VoIP data packets and data packets containing information related to web browsing, emailing, and other user applications, all of which may be referred to as user plane data. Other types of information related to the UE's application layer will be familiar to one of skill in the art. Any signal containing such information will be referred to herein as a data signal 30. Information associated with a data signal 30 will be referred to herein as user plane data.

The UE 10 might also send the ENB 20 various types of control signaling such as layer 1 scheduling requests, layer 1 control signaling (CQI, NACK/ACK, etc), layer 2 radio resource control (RRC) messages and mobility measurement messages, and other control messages, all of which may be referred to as control plane data. The UE 10 typically generates such messages as needed to initiate or maintain a call. Any such signal will be referred to herein as a control signal 40. Information associated with a control signal 40 will be similarly referred to herein as control plane data.

Channel quality indicator (CQI) signals and/or messages are included among these control signals. A CQI control signal may be a message transmitted from the UE 10 to the ENB 20 to provide an indication of the current conditions of the radio channel between the UE 10 and the ENB 20. In an embodiment, the ENB 20 may use the CQI control signal to adapt the radio communications techniques employed by one or both of the ENB 20 and the UE 10. For example, the ENB 20 may determine one or more of a modulation mode, a modulation constellation, a modulation bit rate, a coding rate, a redundancy version, an interleaving mode, and other communications parameters based at least in part on the CQI control signal. In an embodiment, the CQI control signal may be transmitted by the UE 10 at a periodic scheduled time interval using an assigned periodic CQI reporting resource. In an embodiment, the ENB 20 may update operational parameters, for example the modulation bit rate, within about two sub-frames. In another embodiment, depending on the alignment between the receiving of the CQI control signal and the sub-frame sequence and depending on the processing in the ENB 20 the signal propagation delay between the UE 10 and the ENB 20, either more or less delay may occur between the UE 10 transmitting the CQI control signal and the ENB 20 updating or adapting the radio communication parameters.

In some cases, a dedicated channel might exist between the UE 10 and the ENB 20 via which control plane data may be sent or requests to send data may be sent. In other cases, a random access channel (RACH) may be used for these purposes. That is, in some cases, a request for resources to send control plane data may be sent via a RACH, and, in other cases, the control plane data itself might be sent via a RACH.

When the UE 10 sends a control signal 40 to the ENB 20, the ENB 20 might return a response signal or other control signal to the UE 10. For example, if the UE 10 sends a mobility measurement message to the ENB 20, the ENB 20 might respond by sending an acknowledgement message or some other handover-related control message to the UE 10. Any such response by the ENB 20 to a control signal 40 sent by the UE 10 will be referred to herein as a response signal 50.

In order to save battery power, the UE 10 might periodically alternate between a high-power mode and a low-power mode. For example, using techniques known as discontinuous reception (DRX), the UE 10 might periodically enter short periods of relatively high power consumption during which data can be received. Such periods will be referred to herein as on-durations. Between the on-durations, the UE 10 might enter longer periods in which power consumption is reduced and data is not received. Such periods will be referred to herein as off-durations. A balance between power savings and performance can be achieved by making the off-durations as long as possible while still keeping the on-durations long enough for the UE 10 to properly receive data.

The term "DRX" is used generically to refer to discontinuous reception. To avoid confusion, the terms "on-duration" and "off-duration" may also be used herein to refer to a UE's capability to receive data. Besides the on-duration, the active time defines the time that the UE is awake which could be longer than the on duration due to the possible inactivity timer running which will keep the UE awake for additional time. Additional information is provided in 3GPP TS 36.321, which is incorporated herein by reference.

FIG. 2 illustrates an idealized view of on-durations and off-durations for the UE 10. On-durations 210 with higher power usage alternate in time with off-durations 220 with lower power usage. Traditionally, the UE 10 receives data only during the on-durations 210 and does not receive data during the off-durations 220. As an example, it might be determined that an entire cycle of one on-duration 210 and one off-duration 220 should last 20 milliseconds. Of this cycle, it might be determined that an on-duration 210 of 5 milliseconds is sufficient for the UE 10 to receive data without significant loss of information. The off-duration 220 would then last 15 milliseconds.

The determination of the sizes of the on-durations 210 and the off-durations 220 might be based on the quality of service (QoS) parameters of an application. For example, a VoIP call might need a higher level of quality (e.g., less delay) than an email transmission. When a call is being set up, the UE 10 and the ENB 20 enter a service negotiation stage in which a QoS is negotiated based on the maximum allowable delay, the maximum allowable packet loss, and similar considerations.

The level of service to which the user of the UE 10 subscribes might also be a factor in the QoS negotiations. When the QoS parameters for a call have been established, the ENB 20 sets the appropriate sizes for the on-durations 210 and the off-durations 220 based on that QoS level.

Turning now to FIG. 3a, CQI control signal transmissions are discussed. A plurality of assigned periodic CQI reporting intervals 250 are shown relative to the on-duration 210 and a retransmission window 230. In some contexts, the assigned periodic CQI reporting intervals 250 may be referred to as assigned periodic CQI reporting resources. The CQI reporting intervals 250 depicted include a first CQI reporting interval 250a, a second CQI reporting interval 250b, a third CQI reporting interval 250c, a fourth CQI reporting interval 250d, a fifth CQI reporting interval 250e, a sixth CQI reporting interval 250f, a seventh CQI reporting interval 250g, an eighth CQI reporting interval 250h, a ninth CQI reporting interval 250i, a tenth CQI reporting interval 250j, an eleventh CQI reporting interval 250k, and a twelfth CQI reporting interval 250l. It is understood that the assigned periodic CQI reporting intervals 250 in a network is an ongoing sequence, and that many CQI reporting intervals 250 precede the first CQI reporting interval 250a and many CQI reporting intervals 250 follow the twelfth CQI reporting interval 250l. In an embodiment, the UE 10 may transmit CQI control signals during each CQI reporting interval 250 using the assigned CQI reporting resources. The retransmission window 230 provides an opportunity for the ENB 20 to retransmit data to the UE 10 that the UE 10 was unable to receive properly during the on-duration.

Turning now to FIG. 3b, CQI control signal transmissions are discussed further. In an embodiment, it may be inefficient for the UE 10 to transmit CQI control signals on every CQI reporting interval 250. Specifically, during some of the CQI reporting intervals when the ENB 20 is not transmitting to the UE 10, there may be no benefit associated with the UE 10 sending CQI control signals to the ENB 20, because the ENB 20 need not adapt communication parameters for communicating with the UE 10 at that time. As depicted in FIG. 3b by dashed arrowed line segments, the UE 10 may turn off or stop transmitting CQI control signals during the first CQI reporting interval 250a and during the ninth CQI reporting interval 250i through the twelfth CQI reporting interval 250l, thereby saving the power that otherwise would have been consumed by transmitting the CQI control signals during the CQI reporting intervals 250a, 250i, 250j, 250k, and 250l. The UE 10 analyzes the schedule of the on-duration 210 and determines to transmit on one of the CQI reporting intervals 250 before the start of the on-duration 210. By beginning transmitting the CQI control signal transmissions before the start of the on-duration 210, the ENB 20 may be able to receive the CQI control signal from the UE 10, to process the CQI information, and determine how to adapt communication parameters by the start of the on-duration 210. In an embodiment, the UE 10 selects the CQI reporting interval 250 that immediately precedes the on-duration 210 for starting CQI control signal transmissions. In some contexts this may be referred to as resuming CQI control signal transmissions. In an embodiment, the UE 10 continues to periodically transmit the CQI control signals until the retransmission window 230 has ended, then the UE 10 stops transmitting CQI control signals. As an example, in FIG. 3b the UE 10 is depicted as periodically transmitting CQI control signals during the second CQI reporting interval 250b through the eighth CQI reporting interval 250h.

Turning now to FIG. 3c, CQI control signal transmissions are discussed further. It may be inefficient for the UE 10 to transmit CQI control signals after the on-duration 210 has concluded or stopped and before the retransmission window 230 begins. The UE 10 analyzes the schedule of the on-duration 210 and may turn off or stop periodic transmissions of the CQI control signal after the on-duration 210 has ended or at the end of the active time. For example, as depicted in FIG. 3c, the UE 10 may turn on periodic transmission of CQI control signals during the second CQI reporting interval 250b through the fourth CQI reporting interval 250d, turn off periodic transmission of CQI control signals during the fifth CQI reporting interval 250e and the sixth CQI reporting interval 250f, turn on or resume periodic transmission of CQI control signals from the seventh CQI reporting interval 250g through the eighth CQI reporting interval 250h, and then turn off periodic transmission of CQI control signals at the ninth CQI reporting interval 250i.

Turning now to FIG. 4a, the timing relationship between the CQI reporting intervals 250 and a plurality of uplink sub-frames and downlink sub-frames of an ENB is discussed. In a practical wireless network a number of time lags are observed between the UE 10 transmitting the CQI control signal and the ENB 20 adapting the communication parameters based on the CQI control signals. A propagation delay is introduced by the time it takes for the radio frequency signal emitted by the UE 10 containing the CQI control signal to propagate through the radio channel to the ENB 20. The ENB 20 processing is segmented into uplink sub-frames 260 and downlink sub-frames 270, for example a first uplink sub-frame 260a, a second uplink sub-frame 260b, a third uplink sub-frame 260c, a first downlink sub-frame 270a, a second downlink sub-frame 270b, and a third downlink sub-frame 270c. The timing of the uplink sub-frame 260 edges and the downlink sub-frame 270 edges may not align due to the propagation delay. As an example, the CQI control signal transmitted during the third CQI reporting interval 250c may be received by the ENB 20 in the first uplink sub-frame 260a, processed by the ENB 20 to adapt communication parameters in the second uplink sub-frame 260b, and the newly adapted communication parameters may be employed by the ENB 20 for communicating with the UE 10 during the third downlink sub-frame 270c. In an embodiment, the best case sub-frame delay is about two sub-frames. In another embodiment, the sub-frame delay may be about three sub-frames or about four sub-frames. In other embodiment, the sub-frame delays may be greater or smaller.

Turning now to FIG. 4b, CQI control signal transmissions are discussed further. In an embodiment, the UE 10 takes the time lags discussed above with reference to FIG. 4a into account in determining when to begin periodic transmission of the CQI control signal before the on-duration 210 and before the retransmission window 230. As an example, as depicted in FIG. 4b, beginning periodic transmission of the CQI control signal with the third CQI reporting interval 250c may not provide enough lead time for the ENB 20 to receive, process, and adapt communication parameters before the beginning of the on-duration 210. If the UE 10 began periodic transmission of the CQI control signal with the third CQI reporting interval, the first downlink sub-frame and also possibly the second downlink sub-frame may not benefit from adaptation based on a fresh CQI control signal and less efficient communication operation between the UE 10 and the ENB 20 may result. For example, an unnecessarily low modulation bit rate and/or low coding rate may be employed, thereby decreasing the throughput of the radio channel. Alternatively, an inappropriately high modulation bit rate and/or high coding rate may be employed, the UE 10 may not receive the data sent by the ENB 20, and the ENB 20 may have to resend some of the data using HARQ, again possibly decreasing the throughput of the radio channel and increasing the UE power consumption for waking up to listen to the retransmissions.

As depicted, the UE 10 begins periodic transmission of CQI control signals with the second CQI reporting interval 250*b*, thereby providing enough time to permit the ENB 20 to receive the CQI control signal, process the CQI control signal, and adapt communication parameters by the start of the on-duration 210. Similarly, the UE 20 determines when to start or resume periodic transmission of the CQI control signal before the retransmission window 230 taking into account the time needed by the ENB 20 to receive the CQI control signal, process the CQI control signal, and adapt communication parameters before the start of the retransmission window 230.

Figure 5A:
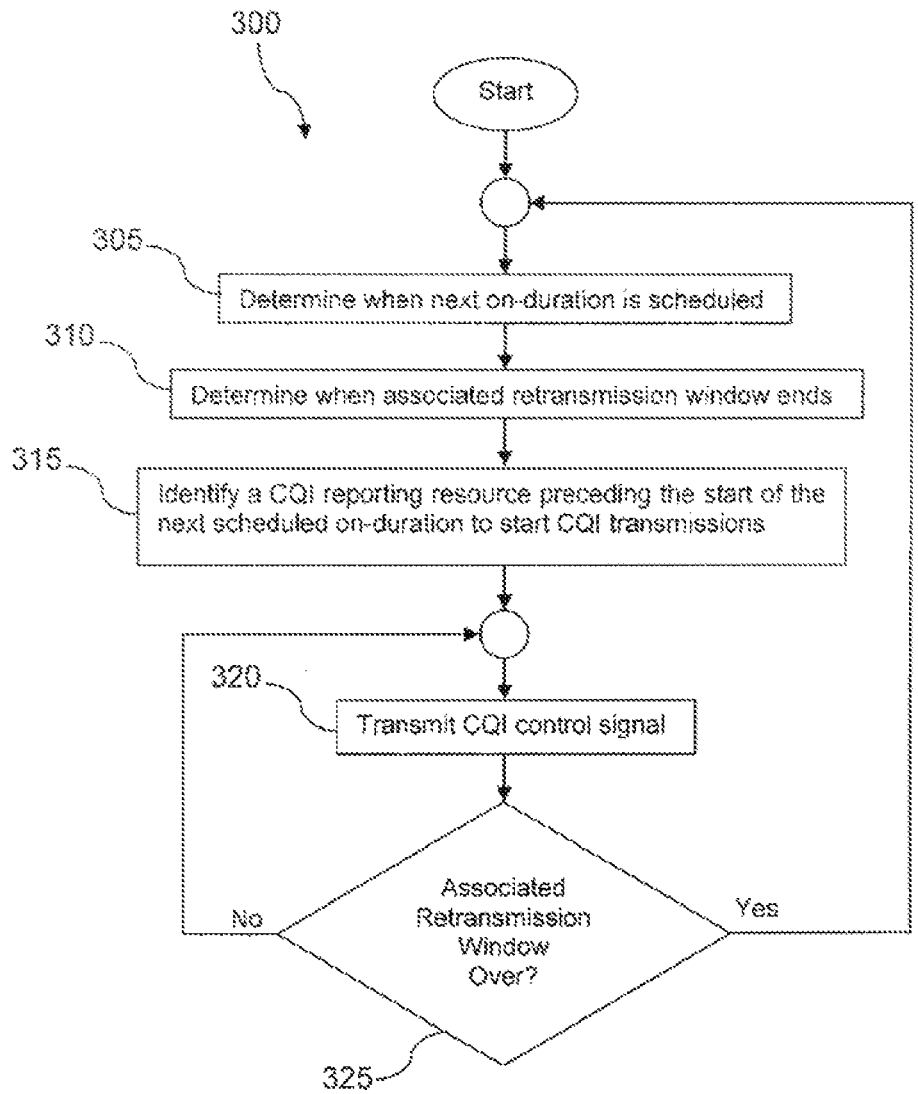
FIG. 5a is an illustration of a method of transmitting channel quality indicator control signals according to an embodiment of the disclosure.

Turning now to FIG. 5*a*, a method 300 of the UE 10 for controlling CQI control signal transmissions is discussed. At block 305, the UE 10 determines when the next on-duration 210 is scheduled. At block 310, the UE 10 determines when the retransmission window 230 associated with the on-duration 210 is scheduled. In block 315, the UE 10 identifies or selects a CQI reporting interval 250 that precedes the start of the on-duration 210. In an embodiment, the UE 10 may select any CQI reporting interval 250 that precedes the start of the on-duration 210. In another embodiment, the UE 10 may select the CQI reporting interval 250 that immediately precedes the start of the on-duration 210. Another way of describing the behavior of this embodiment is that the UE 10 may select the last CQI reporting interval 250 that occurs before the start of the on-duration 210. In another embodiment, the UE 10 takes into account the time lags of radio frequency signal propagation and processing by the ENB 20 to select the CQI reporting interval 250 that precedes the on-duration 210. In an embodiment, the UE 10 may estimate the time lags to consume about a time duration of two sub-frames. In another embodiment, the UE 10 may estimate the time lags to consume about a time duration of three sub-frames or four sub-frames. In some circumstances, depending on timing alignments between the on-duration 210, the UE 10 may select the last CQI reporting interval 250 that occurs before the start of the on-duration 210 or the UE 10 may select the next to the last CQI reporting interval 250 that occurs before the start of the on-duration 210.

At block 320, the UE 10 transmits the CQI control signal on the selected CQI reporting interval 250. In an embodiment, the processing of block 320 may include a waiting process or a sleeping process wherein the process 300 only executes block 320 at the appropriate time, for example at the time of the selected CQI reporting interval 250. At block 325, if the retransmission window 230 associated with the on-duration 210 has not completed, the method 300 returns to block 320. By looping through blocks 320 and 325, the UE 10 periodically transmits the CQI control signal to the ENB 20. In an embodiment, it is understood that the UE 10 re-determines the CQI values and/or information for each new transmission of the CQI control signal. It is also understood that the UE 10 transmits the CQI control signal at about the assigned time of the CQI reporting interval 250 over the assigned CQI reporting resources.

At block 325, if the retransmission window 230 associated with the on-duration 210 has completed, the processing returns to block 305. This can be understood to include stopping periodic transmission of CQI control signals until the method 300 returns to block 320.

Figure 5B:
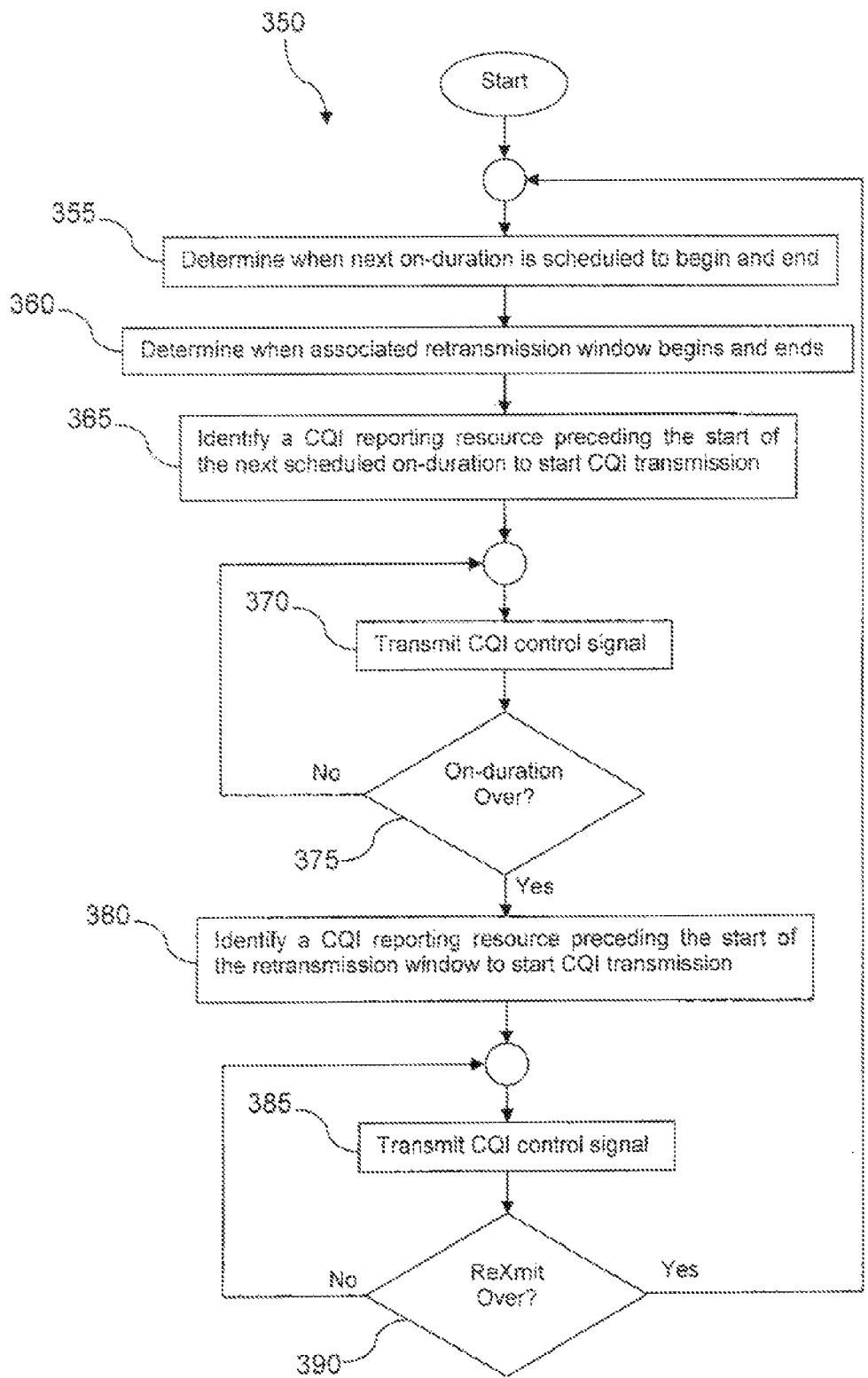
FIG. 5b is an illustration of another method of transmitting channel quality indicator control signals according to an embodiment of the disclosure.

Turning now to FIG. 5*b*, a method 350 of the UE 10 for controlling CQI control signal transmissions is discussed. At block 355, the UE 10 determines when the next on-duration 210 is scheduled to begin and to end. At block 360, the UE 10 determines when the retransmission window 230 associated with the next on-duration 210 is scheduled to begin and end. In block 365, the UE 10 identifies or selects the CQI reporting interval that precedes the next scheduled on-duration 210 to start periodic CQI control signal transmissions. As described with respect to block 315 above, the UE 10 may select the CQI reporting interval according to several different selection criteria, all of which are also contemplated by the method 350.

At block 370, the UE 10 transmits the CQI control signal on the selected CQI reporting interval 250. In an embodiment, the processing of block 370 may include a waiting process or a sleeping process wherein the process 350 only executes block 370 at the appropriate time, for example at the time of the selected CQI reporting interval 250. At block 375, if the on-duration 210 has not completed, the method 350 returns to block 370. By looping through blocks 370 and 375, the UE 10 periodically transmits the CQI control signal to the ENB 20. In an embodiment, it is understood that the UE 10 re-determines the CQI values and/or information for each new transmission of the CQI control signal. It is also understood that the UE 10 transmits the CQI control signal at about the assigned time of the CQI reporting interval 250 over assigned CQI reporting resources.

At block 375, if the on-duration 210 has completed, the processing proceeds to block 380. At block 380, the UE 10 identifies or selects the CQI reporting interval that precedes the retransmission window 230 to start or resume periodic CQI control signal transmissions. As described with respect to block 315 above, the UE 10 may select the CQI reporting interval according to several different selection criteria, all of which are also contemplated by method 350.

At block 385, the UE 10 transmits the CQI control signal on the selected CQI reporting interval 250. In an embodiment, the processing of block 385 may include a waiting process or a sleeping process wherein the process 350 only executes block 385 at the appropriate time, for example at the time of the selected CQI reporting interval 250. At block 390, if the retransmission window 230 has not completed, the method 350 returns to block 385. By looping through blocks 385 and 390, the U E 10 periodically transmits the CQI control signal to the ENB 20. In an embodiment, it is understood that the UE 10 re-determines the CQI values and/or information for each new transmission of the CQI control signal. It is also understood that the UE 10 transmits the CQI control signal at about the assigned time of the CQI reporting interval 250 over assigned CQI reporting resources.

At block 390, if the retransmission window 230 has completed, the processing returns to block 355. This can be understood to include stopping periodic transmission of CQI control signals until the method 350 returns to block 370.

Figure 6:
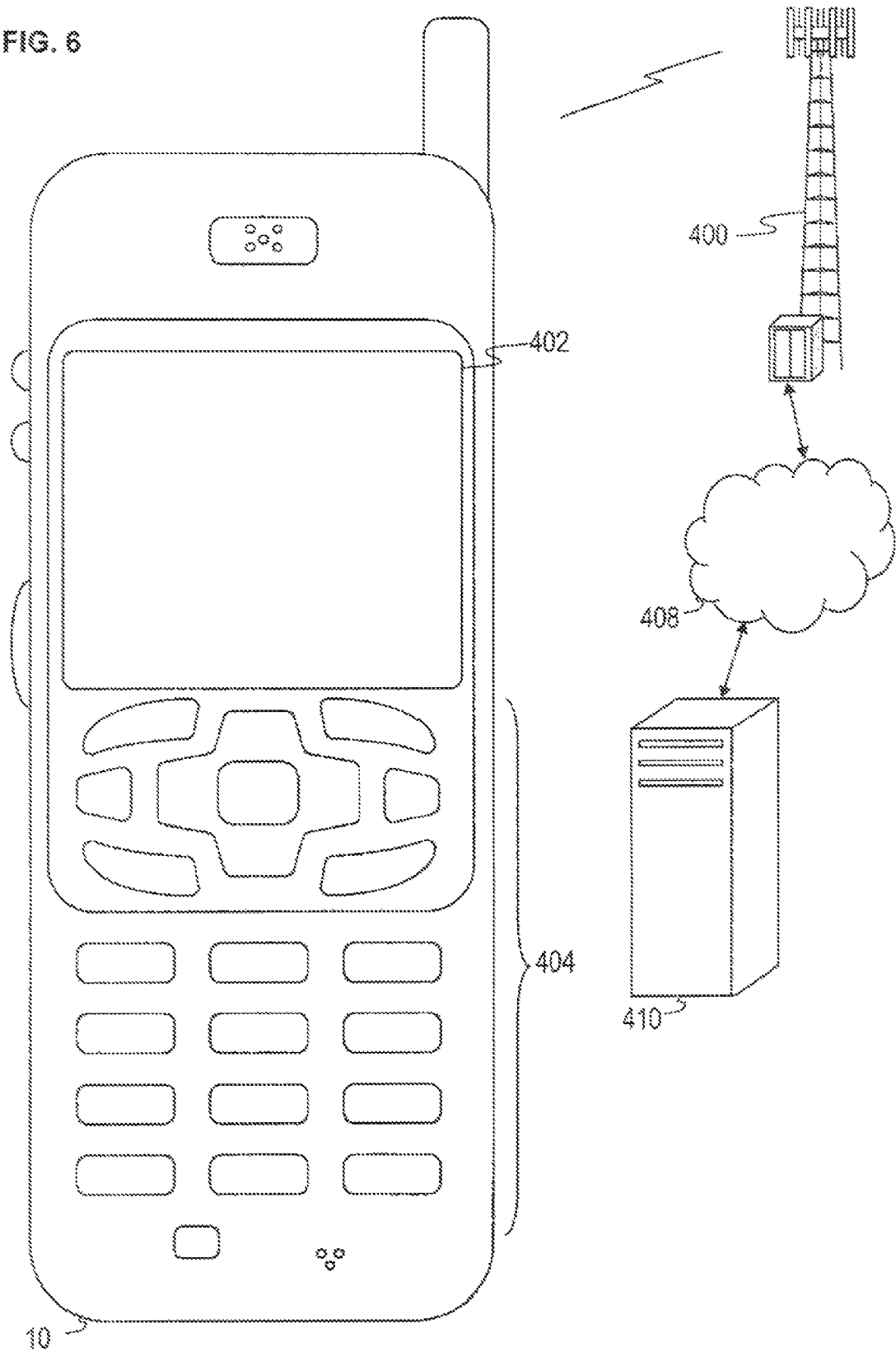
FIG. 6 is a diagram of a wireless communications system including a user equipment operable for some of the various embodiments of the disclosure.

FIG. 6 illustrates a wireless communications system including an embodiment of the UE 10. The UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, or a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 10 may be a portable, laptop or other computing device. The UE 10 may support specialized activities such as gaming, inventory control, job control, and/or task management functions, and so on.

The UE 10 includes a display 402. The UE 10 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction. Additionally, the UE 10 may be programmed and/or configured over-the-air, for example from a wireless base station, a wireless access point, or a peer UE 10.

Among the various applications executable by the UE 10 are a web browser, which enables the display 402 to show a web page. The web page may be obtained via wireless communications with a wireless network access node, a cell tower, a peer UE 10, or any other wireless communication network or system 400. The network 400 is coupled to a wired network 408, such as the Internet. Via the wireless link and the wired network, the UE 10 has access to information on various servers, such as a server 410. The server 410 may provide content that may be shown on the display 402. Alternately, the UE 10 may access the network 400 through a peer UE 10 acting as an intermediary, in a relay type or hop type of connection.

Among FIG. 7 shows a block diagram of the UE 10. While a variety of known components of UEs 10 are depicted, in an embodiment a subset of the listed components and/or additional components not listed may be included in the UE 10. The UE 10 includes a digital signal processor (DSP) 502 and a memory 504. As shown, the UE 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCO) camera 534, a camera controller 536, and a global positioning system (GPS) sensor 538. In an embodiment, the UE 10 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UE 10 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 10 to send and receive information from a cellular network or some other available wireless communications network or from a peer UE 10. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UE 10 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 10 and may also enable the UE 10 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 518 may further connect the DSP 502 to the alert 526 that, when triggered, causes the UE 10 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 10. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 10 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UE 10 to determine its position. Various other peripherals may also be included to provide additional functions, e.g., radio and television reception.

FIG. 8 illustrates a software environment 602 that may be implemented by the DSP 502. The DSP 502 executes operating system drivers 604 that provide a platform from which the rest of the software operates. The operating system drivers 604 provide drivers for the wireless device hardware with standardized interfaces that are accessible to application software. The operating system drivers 604 include application management services ("AMS") 606 that transfer control between applications running on the UE 10. Also shown in FIG. 8 are a web browser application 608, a media player application 610, and Java applets 612. The web browser application 608 configures the UE 10 to operate as a web browser, allowing a user to enter information into forms and select links to retrieve and view web pages. The media player application 610 configures the UE 10 to retrieve and play audio or audiovisual media. The Java applets 612 configure the UE 10 to provide games, utilities, and other functionality. A component 604 might provide functionality related to the present disclosure.

Figure 9:
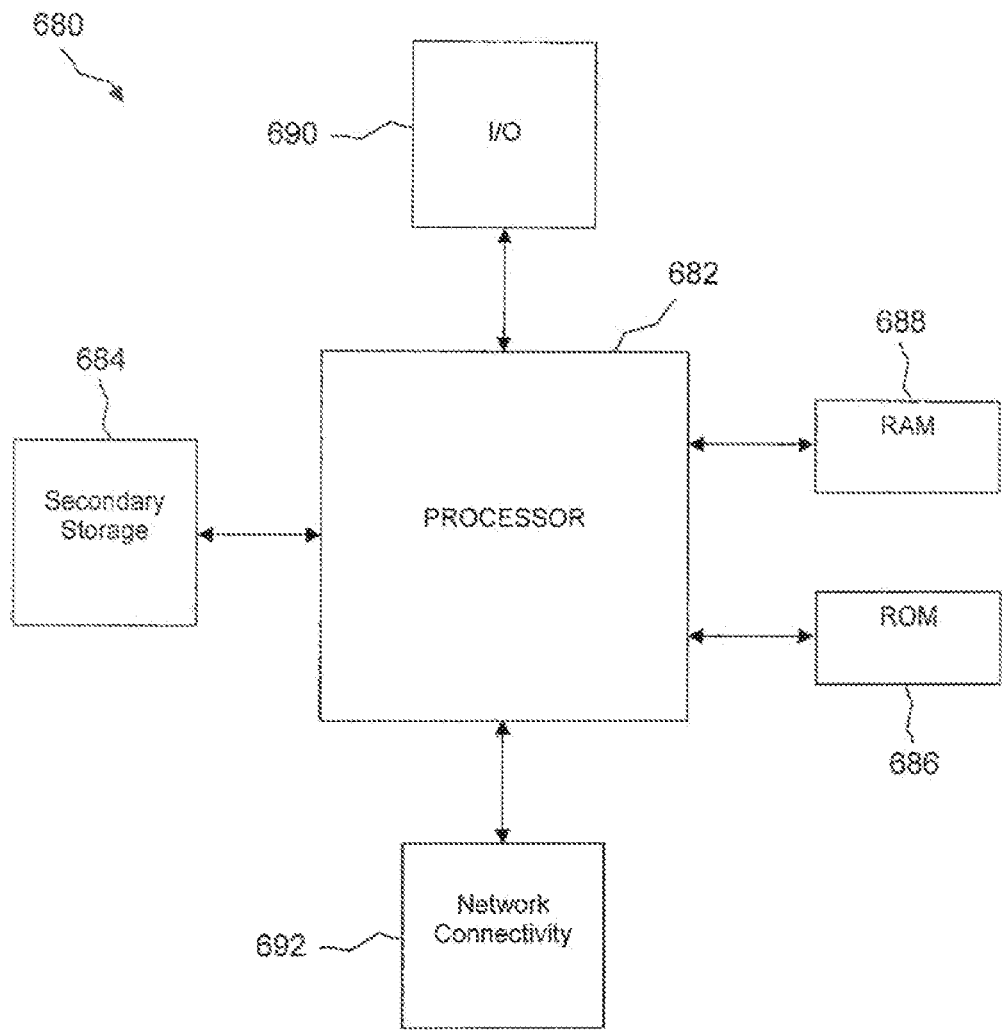
FIG. 9 illustrates an exemplary general-purpose computer system suitable for implementing the several embodiments of the present disclosure.

Some aspects of the system 100 described above may be implemented on any general-purpose computer with sufficient processing power, memory resources, and network throughput capability to handle the necessary workload placed upon it. FIG. 9 illustrates a typical, general-purpose computer system suitable for implementing aspects of one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor 682 may be implemented as one or more CPU chips.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 692 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave. The network connectivity devices 692 may also include one or more transmitter and receivers for wirelessly or otherwise transmitting and receiving signal as are well know to one of ordinary skill in the art.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692. While only one processor 682 is shown, multiple processors may be present. Thus, while instructions may be discussed as executed by a processor, the instructions may be executed simultaneously, serially, or otherwise executed by one or multiple processors.

The following are incorporated herein by reference for all purposes: 3$^{rd}$ Generation Partnership Project (3GPP) Technical Specification (TS) 36.300, 3GPP TS 36.321.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment (UE), comprising:
    a processor configured to:
        control a receiver in the UE to have one or more periodic on-durations, the one or more periodic on-durations each associated with a discontinuous reception (DRX) operation mode of the UE;
        receive a resource configuration, the resource configuration indicating periodic channel quality indicator (CQI) reporting resources;
        determine that data was not received properly;
        determine a time period for one or more potential retransmissions of the data that was not received properly, the time period occurring after the start of one of the on-durations of the DRX operation mode of the UE;
        begin CQI transmissions using the periodic CQI reporting resource at a CQI reporting interval that occurs before the start of the one of the on-durations; and
        end CQI transmissions at a CQI reporting interval that occurs at an end of the time period for potential retransmissions.

2. The UE of claim 1 wherein the processor is configured to begin CQI transmissions using an assigned periodic CQI reporting resource that immediately precedes the start of the on-duration of the DRX operation mode.

3. The UE of claim 1 wherein the processor is configured to begin CQI transmissions using an assigned periodic CQI reporting resource that immediately precedes a lead time before the on-duration of the DRX operation mode, where the lead time is determined as the sum of a propagation delay of sending the CQI transmission to travel from the UE to an enhanced node B (ENB) and a processing lag time of the ENB to receive, process, and adapt based on the CQI transmission.

4. The UE of claim 3, wherein the processing lag time of the ENB is equal to about a time duration of two sub-frames.

5. The UE of claim 1, wherein the UE is a long-term evolution (LTE) UE.

6. The UE of claim 1, wherein the processor is further configured to receive voice over internet protocol transmissions from an enhanced node B (eNB) during one or more of the periodic on durations using a resource configured by the eNB.

7. The UE of claim 1, wherein the CQI is a layer 1 control signal.

8. The UE of claim 1, wherein the processor is further configured to transmit a request to send data to an enhanced node B.

9. A method for transmitting a control signal from a user equipment (UE) to an enhanced node B (ENB), comprising:
    determining when an on-duration of a discontinuous reception (DRX) operation of the UE is scheduled;
    identifying an assigned periodic channel quality indicator (CQI) reporting resource preceding the scheduled start of the on-duration;
    determining that data was not received properly;
    determining a time period one or more potential retransmissions of the data that was not received properly, the time period occurring after the start of the on-duration of the DRX operation of the UE;
    beginning a periodic CQI control signal transmission at the time of the assigned periodic CQI reporting resource identified; and
    ending CQI transmissions at a CQI reporting interval that occurs at the end of the time period for potential retransmissions.

10. The method of claim 9, herein identifying an assigned periodic CQI reporting resource preceding the start of the on-duration is further characterized as identifying the assigned periodic CQI reporting resource that immediately precedes the start of the on-duration.

11. The method of claim 9, wherein identifying an assigned periodic CQI reporting resource that immediately precedes a lead time before the on-duration, where the lead time is determined as the sum of a propagation delay of sending the CQI transmission to travel from the UE to an the ENB and a processing lag time of the ENB to receive, process, and adapt based on the CQI transmission.

12. A method for transmitting a control signal from a user equipment (UE) to an enhanced node B (ENB), comprising:

identifying one or more periodic on-durations, each on-duration associated with a DRX operation mode of the UE;
identifying an assigned periodic channel quality indicator (CQI) reporting resource;
determining that data was not received properly;
determining a retransmission window for one or more potential retransmissions of the data that was not received properly, the retransmission window occurring after the start of one of the on-durations of the DRX operation mode of the UE;
transmitting periodic CQI control signal during the retransmission window;
identifying an end of a retransmission window; and
responsive to an end of the retransmission window, stopping the periodic transmission of the CQI control signal.

13. The method of claim 12, further comprising providing periodic CQI control signal transmissions immediately before the start of the retransmission window.

* * * * *